United States Patent
Lamb et al.

(10) Patent No.: US 6,449,348 B1
(45) Date of Patent: Sep. 10, 2002

(54) POWER TRANSFER APPARATUS FOR USE BY NETWORK DEVICES INCLUDING TELEPHONE EQUIPMENT

(75) Inventors: Christopher Hume Lamb, Weston, MA (US); Peter S. Wang, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 33 days.

(21) Appl. No.: 08/865,015

(22) Filed: May 29, 1997

(51) Int. Cl.[7] ............................................. H04M 11/00
(52) U.S. Cl. ............................. 379/93.36; 340/310.01
(58) Field of Search .......................... 379/90.01, 93.01, 379/93.36, 102.04, 399, 206; 340/310.01, 310.02, 310.07, 310.08; 370/419, 442, 487, 490; 375/257, 259; 445/3.1–3.3

(56) References Cited

U.S. PATENT DOCUMENTS

| | | | | |
|---|---|---|---|---|
| 4,639,714 A | * | 1/1987 | Crowe | 340/310.02 |
| 4,821,319 A | * | 4/1989 | Middleton et al. | 379/399 |
| 5,051,720 A | * | 9/1991 | Kittirutsunetorn | 340/310.02 |
| 5,068,890 A | * | 11/1991 | Nilssen | 379/90.01 |
| 5,148,144 A | * | 9/1992 | Sutterlin et al. | 340/310.01 |
| 5,444,184 A | * | 8/1995 | Hassel | 379/90.01 |
| 5,467,384 A | * | 11/1995 | Skinner, Sr. | 340/310.01 |
| 5,477,091 A | * | 12/1995 | Fiorina et al. | 340/310.01 |
| 5,841,360 A | * | 11/1998 | Binder | 340/310.01 |
| 5,994,998 A | * | 11/1999 | Fisher et al. | 340/310.01 |
| 6,011,794 A | * | 1/2000 | Mordowitz et al. | 379/90.01 |

* cited by examiner

Primary Examiner—Stella Woo
Assistant Examiner—George Eng
(74) Attorney, Agent, or Firm—McDonnell Boehnen Hulbert & Berghoff (57) ABSTRACT

One embodiment of the invention includes an apparatus for providing electric power to a telephone across a transmission line where the telephone is coupled to a network device. A power and data coupler ("the coupler") is coupled to one end of the transmission line. The transmission line is also adapted for transmission of a data signal. The data signal includes telephone signal data for communications with the telephone. The coupler has a data input and a power input. Power from the power input is coupled to the data signal from the data input and the combined power supply current and data signal is coupled to one end of the transmission line. The opposite end of the transmission line is coupled to a power and data decoupler ("the decoupler"). The decoupler has a power output and a data output. Both the data output and power output of the decoupler are coupled to the network device. The combined power and data signal is decoupled by the decoupler, and the data signal is supplied to the data output and the power is supplied to the power output. The invention also includes a circuit. The telephone circuit receives the power from the power output and receives the telephone signal data. The circuit couples the power and the telephone signal data together to make a combined power and telephone signal, which can be used by the telephone.

15 Claims, 3 Drawing Sheets

POWER TRANSFER APPARATUS FOR USE BY NETWORK DEVICES INCLUDING TELEPHONE EQUIPMENT

RELATED APPLICATIONS

This application relates to, and incorporates by reference, U.S. Pat. application Ser. No. 08/865,016 filed on May, 29, 1997, entitled, "Power Transfer Apparatus for Concurrently Transmitting Data and Power Over Data Wires," having inventors David A. Fisher, Lawrence M. Burns, and Stephen Muther, and being assigned to the assignee of the present application.

BACKGROUND OF THE INVENTION

1. Field of the Invention

The invention relates in general to the field of data networking and communications, and in particular to interconnecting computers to a local area network ("LAN") or a wide area network ("WAN") through data lines that carry power, network data and telephone data.

2. Description of the Related Art

Network devices, such as networked personal computers, typically communicate via wired data lines and receive power from a separate line. For example, personal computers ("PCs") may communicate ethernet signals via category three (CAT-3) or category five (CAT-5) twisted pair wire and receive power from a second cable connected to a power source, such source, such as a wall socket or a battery. However, it is desirable to be able to eliminate the need for the second cable.

The following describes examples of network devices that benefit from the elimination of the separate power line, and then describes some of the inadequacies of previous solutions.

Plain old telephone service ("POTS") combines a voice signal with a power signal. The combined signal is transmitted over twisted pair cable between the telephone and the line card at the public telephone exchange office. The line card also supplies power over the two wires carrying the voice signal. However, the voice signal supported by POTS is not sufficient for bandwidth intensive communications needs, such as, ethernet communications. Similarly, ISDN communications transmit power and digital data over between an ISDN modem and a telephone switch. However, ISDN data rates are more than an order of magnitude lower than ethernet data rates.

Additionally, telephone systems using private bridge exchanges (PBXs) typically have a wired connection that is separate from the network devices. This additional wired connection carries both telephone data signals and power to the telephone. The telephone data signals may be either digital or analog data signals that carry the voice conversations to and from the PBX to a telephone. The PBX is responsible for relaying the voice conversation to and from other users or out into the public telephone exchange. The PBX also supplies the telephone with power. In the event of a power outage, the PBX may have a back up power supply to allow users to continue to use their phones during the power outage.

POTS does have one important feature which is supported by some PBX systems. During a power failure, the telephone continues to operate. This is because power is supplied to the telephone directly from a backup power system at the PBX or the central switch. This is a desirable feature of telephone systems.

In previous systems where a user has both a network device and a telephone, the user will have a cable connected to the network for network communications with the network device, a cable connected to a power source for the powering the network device, and a cable connected to the PBX for powering and carrying communications to and from the telephone. One problem with such a system is the cost of installing and maintaining all of these cables. Therefore, it is desirable to have a system that supplies the same general network device and telephone functionality to the user, but reduces the significant cabling costs of the system.

Therefore, what is needed is a solution that reduces the wiring requirements to transmit data and power to a network device and a telephone without significantly reducing the functionality of the network device and the telephone.

SUMMARY OF THE INVENTION

One embodiment of the invention includes an apparatus for providing electric power to a telephone across a transmission line where the telephone is coupled to a network device. A power and data coupler ("the coupler") is coupled to one end of the transmission line. The transmission line is also adapted for transmission of a data signal. The data signal includes telephone signal data for communications with the telephone. The coupler has a data input and a power input. Power from the power input is coupled to the data signal from the data input and the combined power supply current and data signal is coupled to one end of the transmission line. The opposite end of the transmission line is coupled to a power and data decoupler ("the decoupler"). The decoupler has a power output and a data output. Both the data output and power output of the decoupler are coupled to the network device. The combined power and data signal is decoupled by the decoupler, and the data signal is supplied to the data output and the power is supplied to the power output. The invention also includes a telephone circuit. The telephone circuit receives the power from the power output and receives the telephone signal data. The telephone circuit couples the power and the telephone signal data together to make a combined power and telephone signal, which can be used by the telephone.

In another embodiment, the invention includes a power switch to selectively switch between power from the decoupler and power from an external source. In one embodiment, the power switch selects power from the decoupler when a power outage, for example, causes the external power source to cease supplying power.

In another embodiment, the transmission line includes two transmission lines. One of the transmission lines carries both data and power signals. In another embodiment, data and power signals are carried on both of the transmission lines.

In other embodiments, the power signal includes alternating current and/or direct current.

In another embodiment, the transmission lines include twisted pair cables. These features of the invention will be apparent from the following description which should be read in light of the accompanying drawings.

DESCRIPTION OF THE PREFERRED EMBODIMENT

The following describes multiple embodiments of the invention. In one embodiment, a coupling device couples a telephone signal data and computer data are and transmits the combined data to a network device such as a personal computer. A network interface card in the computer receives the combined data and helps separate the telephone data from the computer data. The network interface card then transmits the telephone data to a telephone connected to the network interface card. When the computer is powered down, such as during a power failure, the coupling device also couples a power signal to the combined data signal. The network interface card uses the power to power the telephone. Thus, a user can still use the telephone during a power failure.

In another embodiment of the invention, telephone voice data (also called bearer data) is formatted as ethernet packets. These telephone ethernet packets are communicated with the other ethernet packets in an ethernet network. A network infrastructure device, such as a hub, receives the ethernet packets from the ethernet network, and forwards packets addressed to a particular personal computer to that personal computer. The personal computer includes a network interface card. Coupled to the network interface card is a telephone. The network interface receives the forwarded packets from the hub and extracts the bearer data. The network interface card then couples a power signal from the personal computer with the bearer data. In the event of a power failure, or some other interruption of power from the personal computer to the telephone, a coupler circuit in the hub couples a power signal with the ethernet packets that are being forwarded to the personal computer. The power signal from the hub can then be used to power the network interface card and the telephone.

Power Transfer Apparatus Overview

Figure 1:
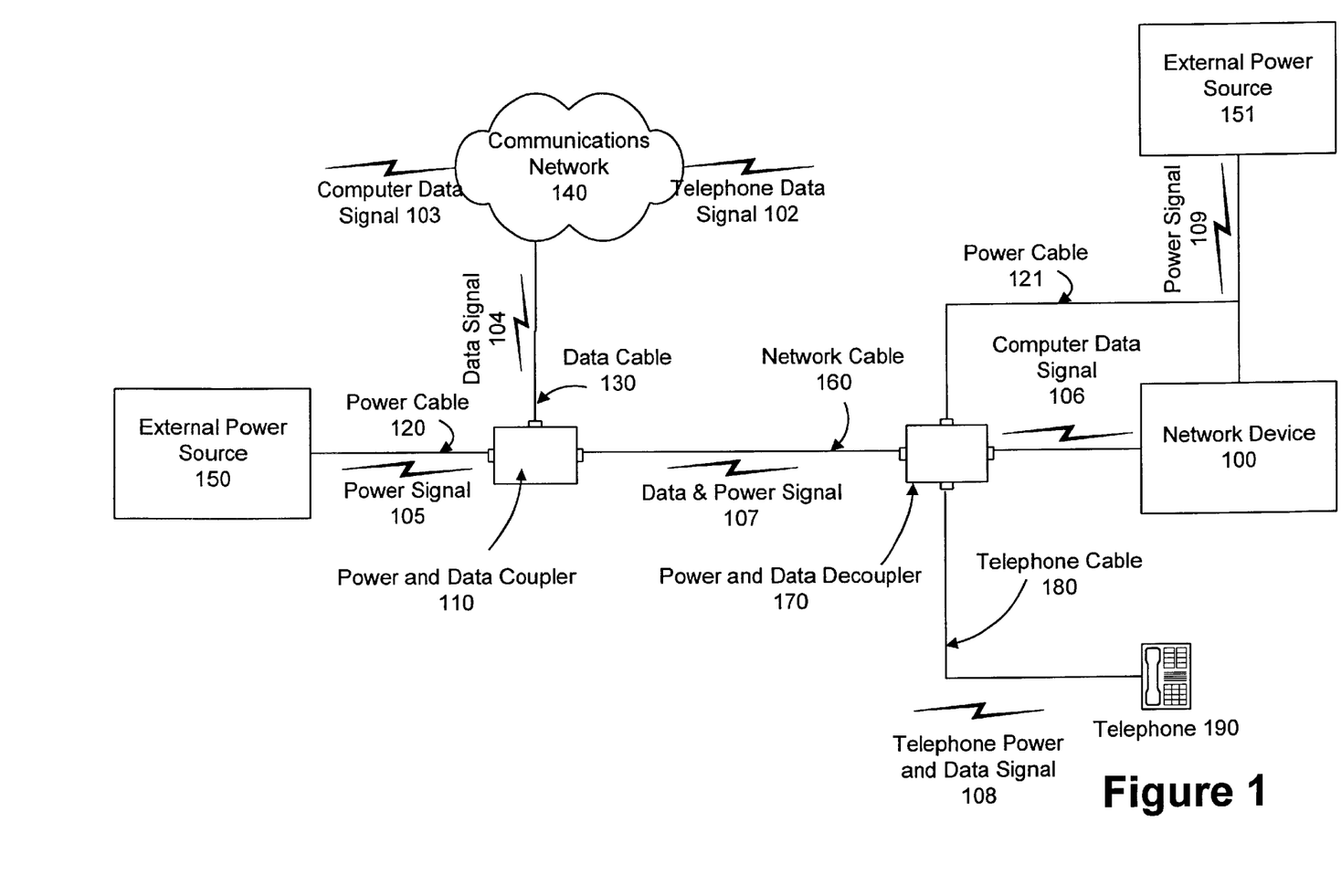
FIG. 1 is an overview of an installation of a power transfer apparatus that supports both computer data and telephone data communications.

FIG. 1 shows the overall configuration of the one embodiment of the invention including a power transfer apparatus. The following lists the elements in FIG. 1 and then describes those elements.

FIG. 1 includes the following elements: an external power source 150; a power cable 120; a data cable 130; a power and data coupler 110; a network cable 160; a power and data decoupler 170; a network device 100; a telephone 190; an external power source 151; and, a power cable 121.

The following describes the coupling of the elements of FIG. 1. The external power source 150 couples to the power and data coupler 110 via the power cable 120. The power cable 120 couples to the power and data coupler 110. The communications network 140 transmits both computer data signals 103 and telephone data signals 102. The communications network 140 couples to the data cable 130. The data cable 130 couples to the power and data coupler 110. The power and data coupler 110 also couples to the network cable 160. The network cable 160 couples to the power and data decoupler 170. The power and data decoupler 170 couples to the network device 100 and the telephone 190. The external power source 151 couples to the power cable 121. The power cable 121 couples to both the power and data decoupler 170 and to the network device 100.

The following describes the elements in greater detail and describes how the elements act together.

The external power source 150 provides a power signal 105 to the power and data coupler 110. Various embodiments of the invention use different external power sources 150: such as, a computer's power supply, a battery, or a wall outlet and adaptor. What is important, however, is that there is some source of power that can eventually be supplied to the network device 100.

In one embodiment, the power cable 120 is a standard two wire power cable. Other embodiments use other power transfer apparatuses to provide power to the power and data coupler 110. For example, in one embodiment, the external power source and the power and data coupler 110 are included in a hub.

The communications network 140 is representative of many different types of communications networks supported by various embodiments of the invention. Example communications networks 140 include FDDI, ethernet (including ten Mbits/s, one hundred Mbits/s, and one Gigabits/s standards), ATM, token ring, and AppleTalk. However, what is important is that a data signal 104 is communicated between the communication network 140 and the network device 100. Also, the communications network 140 transmits both computer data signals 103 and the telephone data signal 102.

In one embodiment, the telephone data signal 102 includes the bearer portion of a telephone signal. The bearer data is, for example, the voice signal. In another embodiment, the telephone data signal includes additional data supporting functions such as caller ID and voicemail access. The telephone data signal 102 is formatted and transmitted in ethernet packets. These ethernet packets are formatted the same way as the ethernet packets for the computer data 103. Thus, in this embodiment, the data signal 104 comprises ethernet packets.

The power and data coupler 110 will normally transmit the data signal 104. However, when the power signal 109 is not available to power the telephone 190, the power and data coupler 110 couples the power signal 105 with the data signal 104 to produce a combined power and data signal 107. The power and data coupler 110 is described in greater detail below. What is important is that there is some combined power and data signal 107 that can eventually be supplied to the telephone 190.

The network cable 160 includes one or more wires for transmitting the combined power and data signal 107. In one embodiment, the network cable 160 includes an CAT-3 or CAT-5 twisted pair cable.

The network device 100 represents a class of devices supported by various embodiments of the invention. For example, in one embodiment, the network device 100 includes a network computer. In another embodiment, the network device 100 includes a personal computer having a network interface card.

The telephone 190 is coupled to the power and data decoupler 170 via the telephone cable 180. The telephone 190 is representative of any of a number of telephones. Various embodiments of the invention include plain old telephone service telephones, telephones with PBX features (such as are available from Nortel, Rolm, and Lucent Technology). In some embodiments, the telephones 190 communicate analog telephone signals over the telephone cable 180. In other embodiments, the telephone 190 communicates digital telephone signals over the telephone cable 180 (in these embodiments, the telephone 190 includes the digital to analog circuits for converting the users voice signal to and from a digital representation). The telephone cable 180, in one embodiment, is a four wire telephone cable. In other embodiments, the telephone cable 180 includes two wire, six wire, or more, telephone cable.

The external power source 151 provides a power signal 109 to the network device 100 and to the power and data decoupler 170 via the power cable 121. Various embodiments of the invention use different external power sources 151: such as, a computer's power supply, a battery, or a wall outlet and adaptor. What is important, however, is that there is some source of power that is supplied to the network device 100 during normal operation. However, when the external power source 151 is not available, such as during a power outage or when the power cable 121 is not connected to the power and data decoupler 170, the power from the combined data and power signal 170 can be used to power the telephone 190.

The power and data decoupler 170 is responsible for supplying telephone data and power to the telephone 180, and computer data to the network device 100. The power and data decoupler 170 combines power, from some source, and the telephone data signals to produce the telephone power and data signal 108. In normal operation, the power and data decoupler 170 combines the power signal 109 with a telephone data signal extracted the data and power signal 107. (In this normal operation, the data and power signal 107 only includes data, not power.) When the power signal 109 is not available, the power and data decoupler 170 decouples the power signal 105 from the data signal 104. The power and data decoupler 170 then couples the power signal with the telephone data signal to produce the telephone power and data signal 108. By being able to continuously power the telephone allows the user to use the telephone, even when the external power source 151 fails.

The following describes the general operation of the elements of FIG. 1. A telephone data signal 102 is combined with a computer data signal 103 in the communications network 140. The data signal 104 is communicated, via the data cable 130, between the communications network 140 and the power and data coupler 110. When the external power source 151 is supplying the power signal 109, the power and data coupler 110 simply transmits the data signal onto the network cable 160 (in this situation, the power and data signal 107 does not include a power signal). The power and data decoupler 170 receives the power and data signal 107 and extracts the telephone data signal and the computer data signal 106. The computer data signal 106 is communicated with the network device 100. The power and data decoupler 170 couples the power signal 109 with the telephone data signal and transmits the combined telephone power and data signal 108 to the telephone 190. However, when the external power source 151 is not supplying the power signal 109, the power and data coupler 110 couples the power signal 105 to the data signal 104. In this situation, the decoupler 170 decouples the power signal from the power and data signal 107. The decoupler 170 still extracts the telephone data and computer data signal 106. (If the network device 100 is not powered, however, the network device 100 will not be processing the computer data signal 106 that does not include the bearer data.) The decoupler 170 then couples the extracted telephone data and the decoupled power signal to create the telephone power and data signal 108 for use by the phone 190. Note that even if the external power source 151 is not working, the telephone 190 will continue to work.

Network Devices Using Power Transfer Apparatuses

Figure 2:
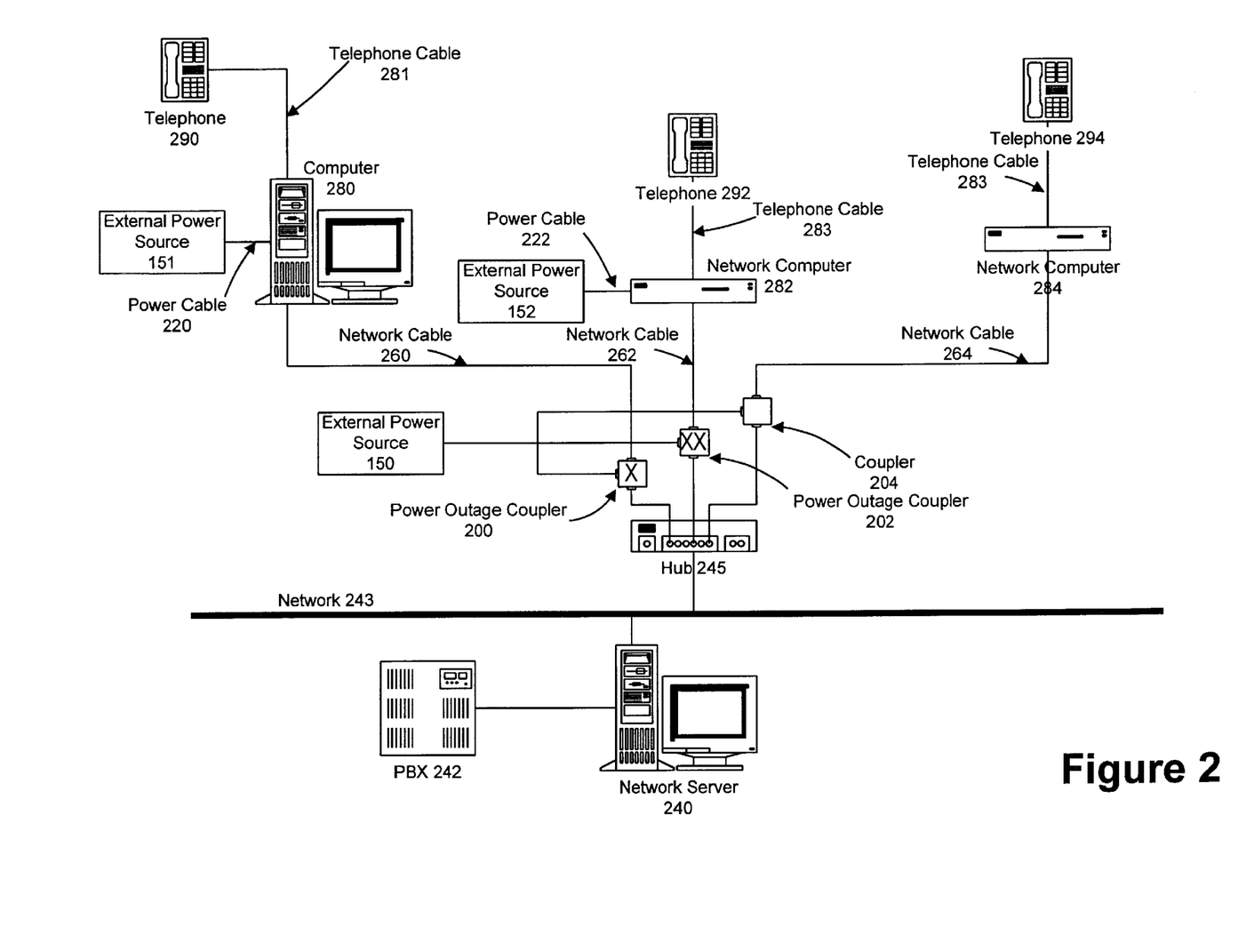
FIG. 2 is an overview of a power transfer apparatus for use with telephone equipment and network devices.

FIG. 2 is an overview of a power transfer apparatus for use with network devices including computers. The following lists the elements in FIG. 2 and then describes those elements.

FIG. 2 includes the following elements: a PBX 242; a network server 240; a network 243; a hub 245; an external power source 150; a power outage coupler 200; a power outage coupler 202; a coupler 204; a network cable 260; an external power source 151; a power cable 220; a computer 280; a telephone 290; a network cable 262; an external power source 152; a power cable 222; a network computer 282; a telephone 292; a telephone cable 281; a network cable 264; a network computer 284; a telephone 294; and, a telephone cable 283.

The PBX 242, the network server 240 and the network 243, work together to provide both telephone data and network data to devices coupled to the network 243. The PBX 242, the network server 240 and the network 243 represent are example devices that provide the telephone functions, network server functions and network functions, respectively. In one embodiment, the PBX 242 includes a PBX having functions similar to a PBX from, for example, Nortel, Rolm, Lucent Technology, or Seimens. However, the PBX 242 has been modified to allow the network server 240 to send the PBX 242's telephone signal data 102 as ethernet packets. Various embodiments of the invention include network servers 240 from, for example, Compaq, Hewlett-Packard, IBM, and Sun Microsystems. The network server 240 acts as a server for the network and includes circuitry and software for communicating with the PBX 242. In one embodiment, the network server supports ethernet protocols for communicating data onto the network 243. The network 243 is illustrative of any of a number of computer networks including ethernet, FDDI, AppleTalk, Token Ring, and ATM.

Note, in another embodiment, the PBX 242 is replaced with a PBX process running in the network server 240 and a gateway. A gateway provides the connection to the public switching network for the network 243. Vienna Systems, Corporation, of Kanata, Ontario, Canada, provides such a gateway.

The hub 245 couples to the network 243 and allows network devices to communicate with the network 243. Each device couples to a different port on the hub 245. For example, in FIG. 2, each coupler couples to a different port on the hub 245. In one embodiment, the hub 245 is not needed to supply the data signal. Therefore, in these embodiments of the invention, the data signal is supplied by a network computer, a router, a switch, and/or a bridge.

The external power source 150 provides power to the couplers. Each coupler, in this example, has a potentially different power requirements, therefore, different external power sources may be used. For example, to power the power outage coupler 200, an adapter can be used. The adapter steps down the available electrical power from 117 or 220 volts AC to an AC or DC voltage that is high enough to provide adequate voltage for the telephone 290. In one embodiment, the power adaptor supplies an output voltage of approximately forty-eight volts. Similar, example power adapters are described in U.S. patent application Ser. No. 08/865,016, filed on May 29, 1997, entitled, "Power Transfer Apparatus for Concurrently Transmitting Data and Power Over Data Wires," having inventors David A. Fisher, Lawrence M. Burns, and Stephen Muther.

The couplers (power outage coupler 200, power outage coupler 202, and power outage coupler 204) provide similar coupling functions as those found in power and data coupler 110. Each coupler couples power and data signals for use by a telephone and some other computing device. The amount of power coupled, and when the power is coupled, is what varies between the various couplers. This will be described in greater detail below. Importantly, these couplers, and the present configuration, is merely illustrative. In some embodiments of the invention, each coupler has the same functionality.

Note that in other embodiments, the hub 245 includes the couplers and the external power source 150.

The following describes three example power and data coupling systems corresponding to coupler 200, coupler 202, and coupler 204 respectively. Each of these systems will now be described.

The following describes the system associated with the coupler 200. The coupler 200 is coupled to the computer 280 via the network cable 260. The external power source 151 couples to the computer 280 via the power cable 220. The telephone 290 couples to the computer 280. Comparing this system to FIG. 1, the computer 280 is the network device 100, and the computer 280 includes the power and data decoupler 170. When the external power source 151 fails, or otherwise becomes incapable of supplying power to the telephone 290, the power and outage coupler 200 is notified to couple power with the data signal from the hub 245. The power and data decoupler 170, in the computer 280, can then switch the source of power from the external power source 151 to the power from the network cable 260. This system is described in greater detail below with respect to FIG. 3.

The following describes the system associated with the coupler 202. The coupler 202 is coupled to the network computer 282. The external power source 152 couples to the network computer 282 via the power cable 222. The telephone 292 couples to the network computer 282 via the telephone cable 283. The network computer 282 includes a power and data decoupler similar to the one in the system of FIG. 1. The power outage coupler 202, and corresponding power and data decoupler, operates in a similar manner as the power outage coupler 200 system, except that the power outage coupler 202 supplies sufficient power to the decoupler to power both the telephone and the network computer 282. In one embodiment, separate power signals (e.g., twenty-four volts DC and forty-eight volts DC) are supplied on different pairs of wires within the network cable 262. The decoupler decouples both these power signals from any data signals. The different power signals are for the different power needs of the telephone 292 and the network computer 282. In another embodiment, only one power signal is transmitted, which is then modified by the decoupler for use by the network computer 282 and the telephone 292.

The following describes the system associated with the coupler 204. The coupler 204 is coupled to the network computer 284 via the network cable 264. The coupler 204 is similar to the power outage coupler 202, but the coupler 204 constantly supplies the power for the network computer 284 and the telephone 294.

In another embodiment of the invention, the decoupler 170 is included in a telephone 190. In this embodiment, the telephone couples directly to a coupler such as coupler 204 and no computer is needed. In one embodiment where the telephone includes the decoupler, the telephone couples to a hub. The hub includes the coupler. The ethernet packets passed from the hub to the telephone include only bearer data. In another embodiment, the ethernet packets include additional data for controlling the telephone. Such data includes other telephone data such as caller ID information, requests to the PBX 242, and the like. In another embodiment, the data also includes computer data for a computer built into the telephone.

In another embodiment of the invention, the telephone includes the decoupler 170 and has network infrastructure functions, such as repeater functions. This allows the telephone to forward any packets it receives to any additional network devices that are downstream from the telephone.

In another embodiment, the telephone has its own external power supply, such as a battery or a wall adapter. The coupler couples a power signal to the network cable 160 when the telephone's power supply fails.

Schematic Diagram of a Power Transfer Apparatus

Figure 3:
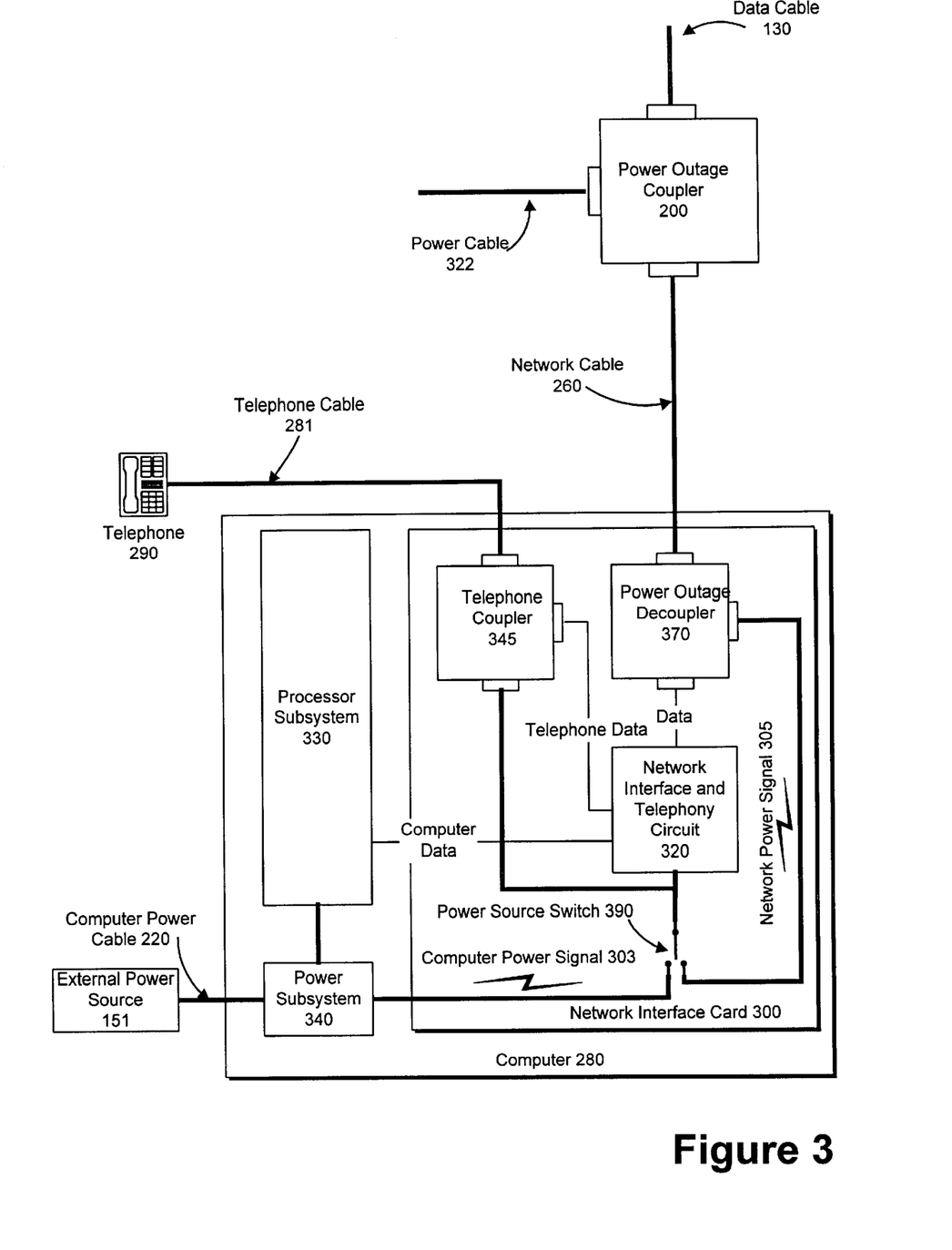
FIG. 3 is a schematic diagram of a power transfer apparatus for use with both computer data and telephone data.

FIG. 3 is a schematic diagram of a power transfer apparatus that supports telephone features. This apparatus corresponds to the system associated with the coupler 200 in FIG. 2. The following first lists the elements in FIG. 3, then describes the elements' couplings, and then describes the elements' interactions.

FIG. 3 includes the power cable 322, the data cable 130, a power outage coupler 200, the network cable 260, the computer 280, the telephone 290, the telephone cable 281, the external power source 151, and the computer power cable 220. The computer 280 includes a network interface card (NIC) 300, a processor subsystem 330, and a power subsystem 340. The NIC 300 includes a power outage decoupler 370, a network interface and telephony circuit 320, a power source switch 390, and a telephone coupler 345.

The elements of FIG. 3 are coupled as follows. The power cable 322, the data cable 130, and the network cable 260 are coupled to the power outage coupler 200 in the same way as shown in FIG. 1. The network cable 260 also couples to the input port of the power outage decoupler 370 on the NIC 300. The data output port of the decoupler 370 couples to the network interface and telephony circuit 320. The computer data port of the network interface and telephony circuit 320 couples to the processor subsystem 330. The power output port of the decoupler 370 couples to one of the two inputs of the power source switch 390. The other input of the power source switch 390 is coupled to the power subsystem 340. The power subsystem 340 also couples to the processor subsystem 330 and to the external power source 151 (via the computer power cable 220). The output of the power source switch 390 couples to the power input ports of the network interface and telephony circuit 320 and the telephone coupler 345. The telephone data port of the network interface and telephony circuit 320 is coupled to the data input port of the telephony coupler 345. The output of the telephone coupler 345 is coupled to the telephone cable 281. The telephone cable 281 couples to the telephone 290.

The following describes the elements and interactions between the elements of FIG. 3. The power subsystem 340 is illustrative of a PC power supply. The power subsystem 340 generally provides the power for the computer 280, including the processor subsystem and the NIC 300. The processor subsystem 330 represents those elements of the computer 280 that are not directly involved with the network interface functions of the computer 280. The NIC 300 includes the elements to perform three main functions. Each of these functions will now be described.

First, the NIC 300 supports network interface services, such as ethernet communications, for the computer 280. In one embodiment, these services are supported using an ethernet communications circuit in the network interface and telephony circuit 320. 3COM Corporation, of Santa Clara, Calif., supplies such circuits.

Second, the NIC 300 also provides telephony services for the telephone 290. As the network interface and telephony circuits 320 receives data from the power outage decoupler 370, the network interface and telephony circuits 320 extracts telephony related data and reformats it for use by the telephone. In one embodiment, this includes providing digital telephone data to the telephone coupler 345. The telephone coupler 345 then converts the digital telephone data to an analog signal and combines this analog signal with the power from the power source switch 390. In one embodiment, the telephone coupler 345 includes circuits similar to those found in a PBX, or in a telephone for use with a PBX. In another embodiment, the telephone 345 includes circuits similar to those found in a line card at a central switching office for coupling power and data together.

Third, the NIC 300 switches between the available power supplies. The power source switch 390 will attempt to use the power from the subsystem 340. However, if a power outage prevents the power subsystem 340 from supplying sufficient power to power the telephone, the power supply switch 340 will switch to using the network power signal 305. In one embodiment, the network interface card will signal the power outage coupler 200 to begin supplying power because of the insufficient computer power signal 303.

Note that the examples described above are merely illustrative. Other embodiments of the invention include different configurations and elements. For example, in one embodiment of the invention, some of the circuits in the power source switch 390 are shared by the power outage decoupler 370 and the telephone coupler 345. In another embodiment, the power outage coupler 200, the power outage decoupler 370, and/or the telephone coupler 345 include electrical isolation circuitry. Examples of such circuitry are described in U.S. patent application Ser. No. 08/865,016, filed on May 29, 1997, entitled, "Power Transfer Apparatus for Concurrently Transmitting Data and Power Over Data Wires," having inventors David A. Fisher, Lawrence M. Burns, and Stephen Muther. In another embodiment, the power coupled by the coupler 200 is an AC power signal, while in another embodiment, the power coupled by the coupler 200 is a DC power signal.

The preceding has described multiple embodiments of the invention. In one embodiment, power, computer data and telephone data are combined and transmitted to a computer. The computer uses the power to power a telephone coupled with the computer. Because the power and data are combined, the telephone can be powered even when the computer has been powered off.

While the foregoing invention has been described in referenced to some of its embodiments, it should be understood that various modifications and alterations will occur to those practiced in the art. Such modifications and alterations are intended to fall within the scope of the appended claims.

What is claimed is:

1. An apparatus for providing power to a telephone coupled to a network device, comprising:
    a transmission line having a proximal end and a distal end, the distal end coupled to the network device;
    a coupler coupled to the proximal end of the transmission line, the coupler having a data input and a power input, the coupler couples power from the power input and the data signal from the data input to the transmission line, the coupled power signal and data signal forming one combined signal, the data signal including telephone bearer data;
    a decoupler coupled to the distal end of the transmission line, the decoupler having a data output coupled to the network device and a power output coupled to the network device, the decoupler supplies the data signal from the transmission line to the data output and the power from the transmission line to the power output;
    a circuit coupled to the decoupler and to the data signal, the circuit having a combined telephone and power signal output, the combined telephone and power signal output for outputting a combined signal that is a combination of the power and a telephone data signal corresponding to the data signal; and
    a power source switch coupled to the telephone, the power source switch having a first input coupled to the power output of the decoupler, the power source switch further having a second input coupled to receive a second power signal from an external power source, and wherein the power source switch is switchable between the first input and the second input to carry power to the telephone from one of at least the decoupler or the external power source.

2. The apparatus of claim 1 wherein the power source switch is for selecting a power signal from the second input when a power signal is present at the second input, otherwise selecting a power signal from the first input.

3. The apparatus of claim 1 further comprising a computer wherein the computer includes a power supply device and a network interface device and wherein the network interface device includes the power switch to select between power from the power supply device and power from the power output of the decoupler.

4. The apparatus of claim 1 wherein the network device includes a computer and wherein the computer includes a network interface card and wherein the decoupler and the circuit are at least partially disposed on the network interface card.

5. The apparatus of claim 1 wherein the power includes alternating current.

6. The apparatus of claim 1 wherein the power includes direct current.

7. The apparatus of claim 1 wherein the transmission line comprises a twisted pair cable.

8. A power transmission adapter for decoupling a power supply current and a data signal from a coupled signal, the data signal includes telephone data and computer network data, the power transmission adapter comprising:
    an input port having one or more data signal conductors adapted for receiving the coupled signal;
    an electrical power output port for transmitting the power supply current;
    a data communication port for transmitting the data signal, the data signal having telephone data and network data; and
    a decoupling circuit, coupled to the input port and the electrical power output port and the data communication port, and which decouples the data signal and the power supply current from the coupled signal and transmits the power supply current to the electrical power output port and the data signal to the data communication port
    a power source switch, the power source switch having a first input coupled to the power output of the decoupling circuit, the power source switch further having a second input coupled to receive a second power signal from an external power source, and wherein the power source switch is selectable between the first input and the second input.

9. The power transmission adapter of claim 8 wherein the power supply current includes direct current.

10. A power transmission adapter for decoupling a power supply signal and a data signal from a coupled signal being transmitted to a telephone, the data signal includes telephone data and computer network data, the power transmission adapter comprising:
    means for transmitting the data signal, the data signal having telephone data and network data; and means, coupled to receive the coupled signal and to transmit the power supply signal and the data signal, for decoupling the data signal and the power supply signal from the coupled signal and transmits the power supply signal to a electrical power output port and the data signal to a data communication port means, having a first input coupled to the power output port and a second input coupled to receive a second power signal from an external power source, for selecting between the first input and the second input to output a power supply signal for carrying power to the telephone from at least one of either the decoupling means or the external power source.

11. An apparatus for providing power to a telephone coupled to a network device, comprising:

a transmission line having a proximal end and a distal end, the distal end coupled to the network device;

coupler coupled to the proximal end of the transmission line, the coupler having a data input and a power input, the coupler couples to the transmission line: (i) power from the power input in response to an external power supply being unavailable; and (ii) data signal from the data input, the coupled power signal and the data signal forming one combined signal, the data signal being (i) telephone data or (ii) telephone data and network data;

a decoupler coupled to the distal end of the transmission line, the decoupler having a data output coupled to the network device and a power output coupled to the network device, the decoupler supplies the data signal from the transmission line to the data output and the power from the transmission line to the power output;

a circuit coupled to the decoupler and to the data signal, the circuit having a combined telephone and power signal output, the combined telephone and power signal output for outputting a combined signal that is a combination of the power and the telephone data; and a power source switch coupled to the telephone, the power source switch having a first input coupled to the power output of the decoupler, the power source switch further having a second input coupled to receive a second power signal from the external power source, and wherein the power source switch is switchable between the first input and the second input to carry power to the telephone from one of at least the decoupler or the external power source.

12. A power transmission adapter for decoupling a power supply current and a data signal from a coupled signal, the data signal being telephone data and computer network data, the power transmission adapter comprising:

an input port having at least one data signal conductor adapted for receiving the coupled signal, the coupled signal having the power supply signal coupled to the coupled signal in response to an external power supply being unavailable;

an electrical power output port for transmitting the power supply current;

a data communication port for transmitting the data signal, the data signal being telephone data and network data;

a decoupling circuit, coupled to the input port and the electrical power output port and the data communication port which decouples the data signal and the power supply current from the coupled signal and transmits the power supply current to the electrical power output port and the data signal to the data communication port; and a power source switch, the power source switch having a first input coupled to the power output of the decoupling circuit, the power source switch further having a second input coupled to receive a second power signal from the external power source, and wherein the power source switch is selectable between the first input and the second input.

13. A power transmission adapter for decoupling a power supply signal and a data signal from a coupled signal being transmitted to a telephone, the data signal being telephone data and computer network data, the power transmission adapter comprising:

means for transmitting the data signal, the data signal being telephone data and network data;

means, coupled to receive the coupled signal, the power supply signal being coupled to the coupled signal in response to an external power source being unavailable, and to transmit the power supply signal and the data signal, for decoupling the data signal and the power supply signal from the coupled signal and transmits the power supply signal to a electrical power output port and the data signal to a data communication port; and means, having a first input coupled to the power output port and a second input coupled to receive a second power signal from the external power source, for selecting between the first input and the second input to output a power supply signal for carrying power to the telephone from at least one of either the decoupling means or the external power source.

14. An apparatus for providing power to a telephone coupled to a network device, comprising:

a transmission line having a proximal end and a distal end, the distal end coupled to the network device;

an external power source coupled to the network device, the external power source delivers power to the network device and to the telephone;

a coupler coupled to the proximal end of the transmission line, the coupler having a data input and a power input, the coupler couples power from the power input and a data signal from the data input to the transmission line in response to the external power source being unable to deliver power to the telephone, the coupled power signal and data signal forming one combined signal, the data signal including telephone bearer data and computer data;

a decoupler coupled to the distal end of the transmission line, the decoupler having a data output coupled to the network device and a power output coupled to the network device, the decoupler supplies the data signal from the transmission line to the data output, the decoupler supplies the power from the transmission line to the power output in response to the external power source being unable to deliver power to the telephone;

a circuit coupled to the decoupler and to the data signal, the circuit having a combined telephone and power signal output, the combined telephone and power signal output for outputting a combined signal that is a combination of the power and a telephone data signal corresponding to the data signal; and a power source switch coupled to the telephone, the power source switch having a first input coupled to the power output of the decoupler, the power source switch further having a second input coupled to receive a second power signal from the external power source, and wherein the power source switch switches from the second input to the first input in response to the external power source being unable to deliver power to the telephone so as to carry power to the telephone from the decoupler.

15. A method for providing power to a telephone coupled to a network device comprising the steps of:

providing a transmission line having a proximal end and a distal end, the distal end being coupled to the network device, the transmission line delivering a data signal having telephone bearer data and computer data to the network device and the telephone;

delivering a first power signal to the network device and the telephone by an external power source coupled to the network device;

monitoring the first power signal delivered by the external power source to the network device and the telephone;

coupling a second power signal and the data signal to the transmission line in response to the external power source being unable to deliver the first power signal to the telephone, the coupled second power signal and data signal forming one combined signal;

delivering the one combined signal to the telephone over the transmission line;

decoupling the second power signal from the one combined signal; and delivering the second power signal to the telephone.

* * * * *